(No Model.)　　　　　　　　5 Sheets—Sheet 3.
F. F. RAYMOND, 2d.
HEEL NAILING MACHINE.
No. 344,499.　　　　　　Patented June 29, 1886.
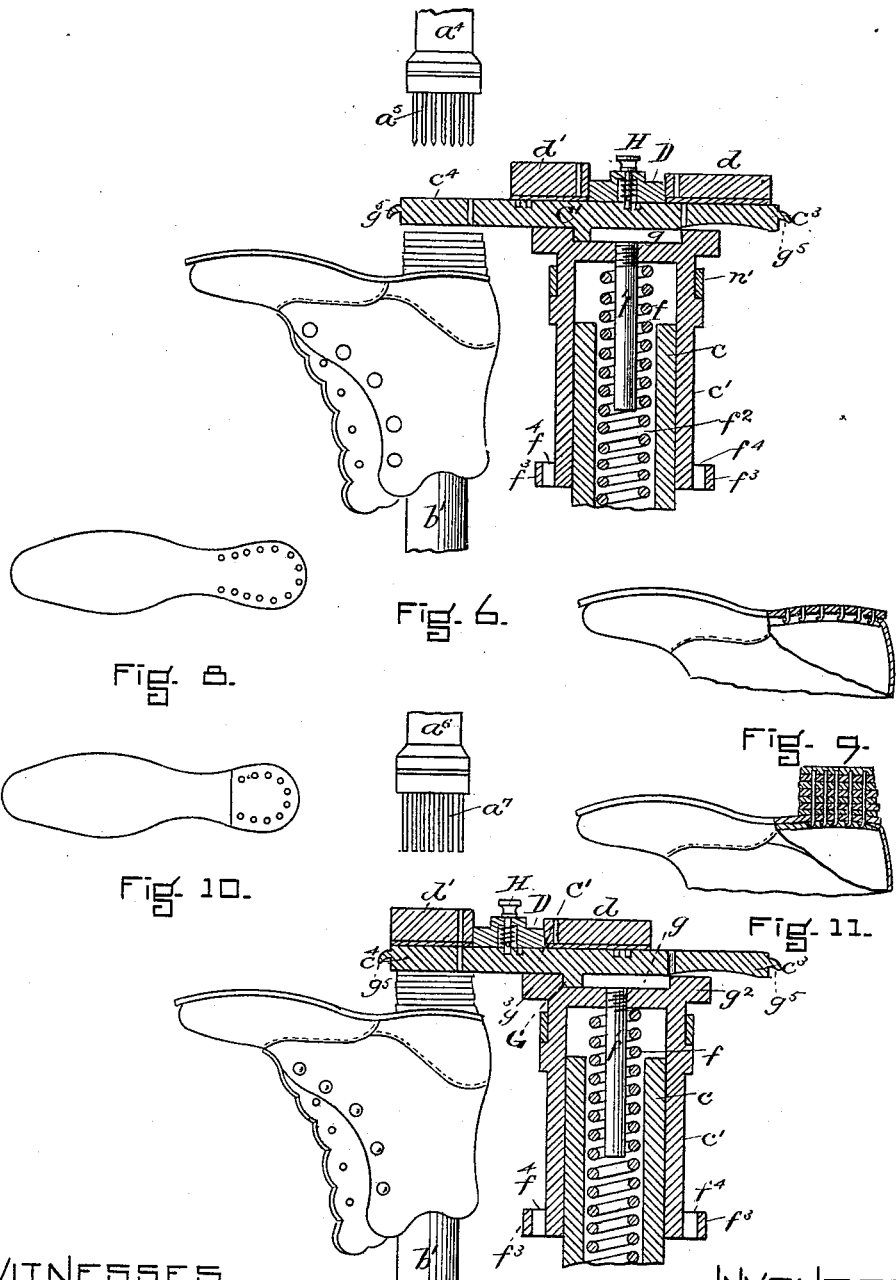
WITNESSES.
Fred B. Dolan
J. M. Dolan
INVENTOR.
F. F. Raymond (No Model.)  
F. F. RAYMOND, 2d.  
HEEL NAILING MACHINE.

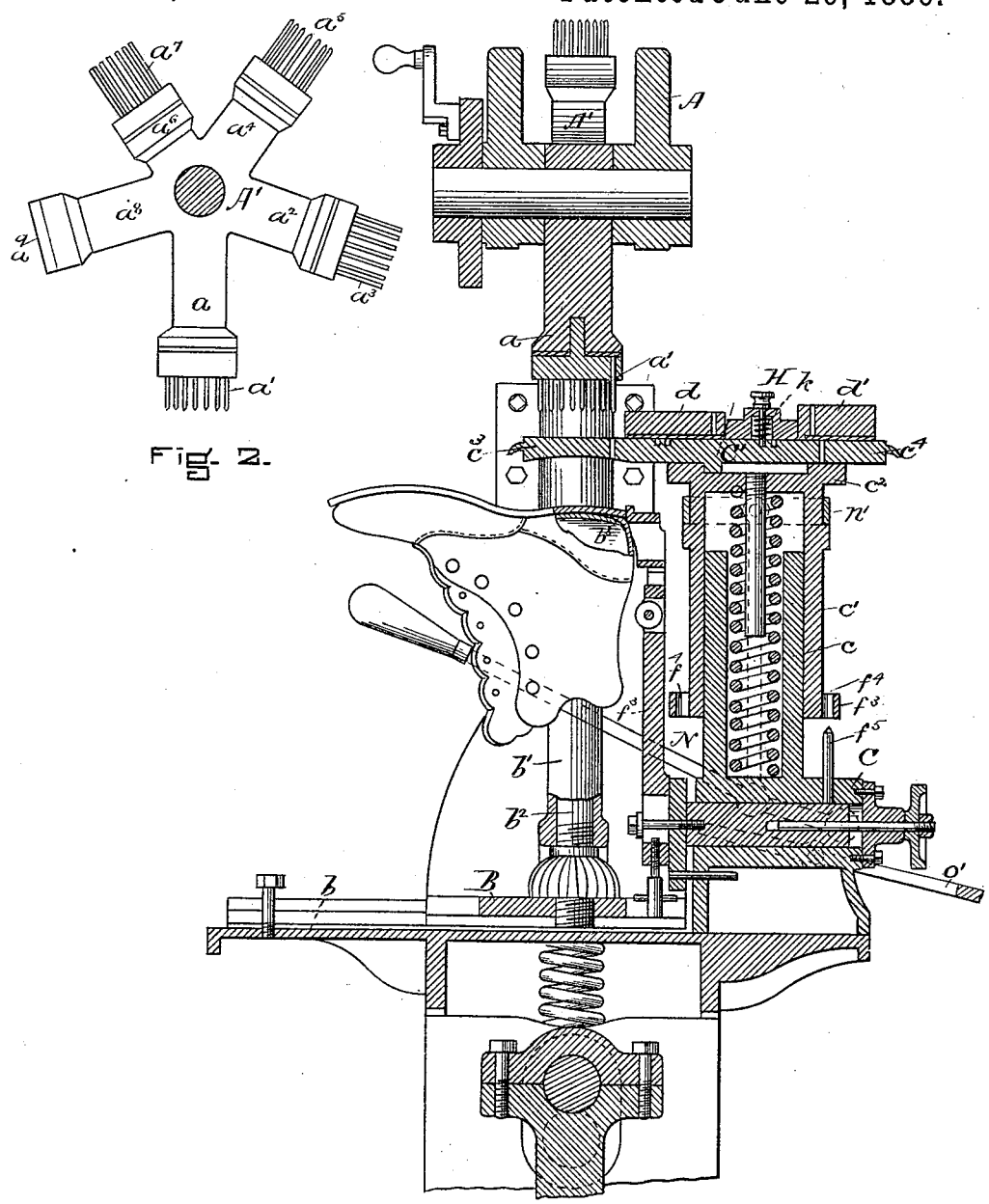

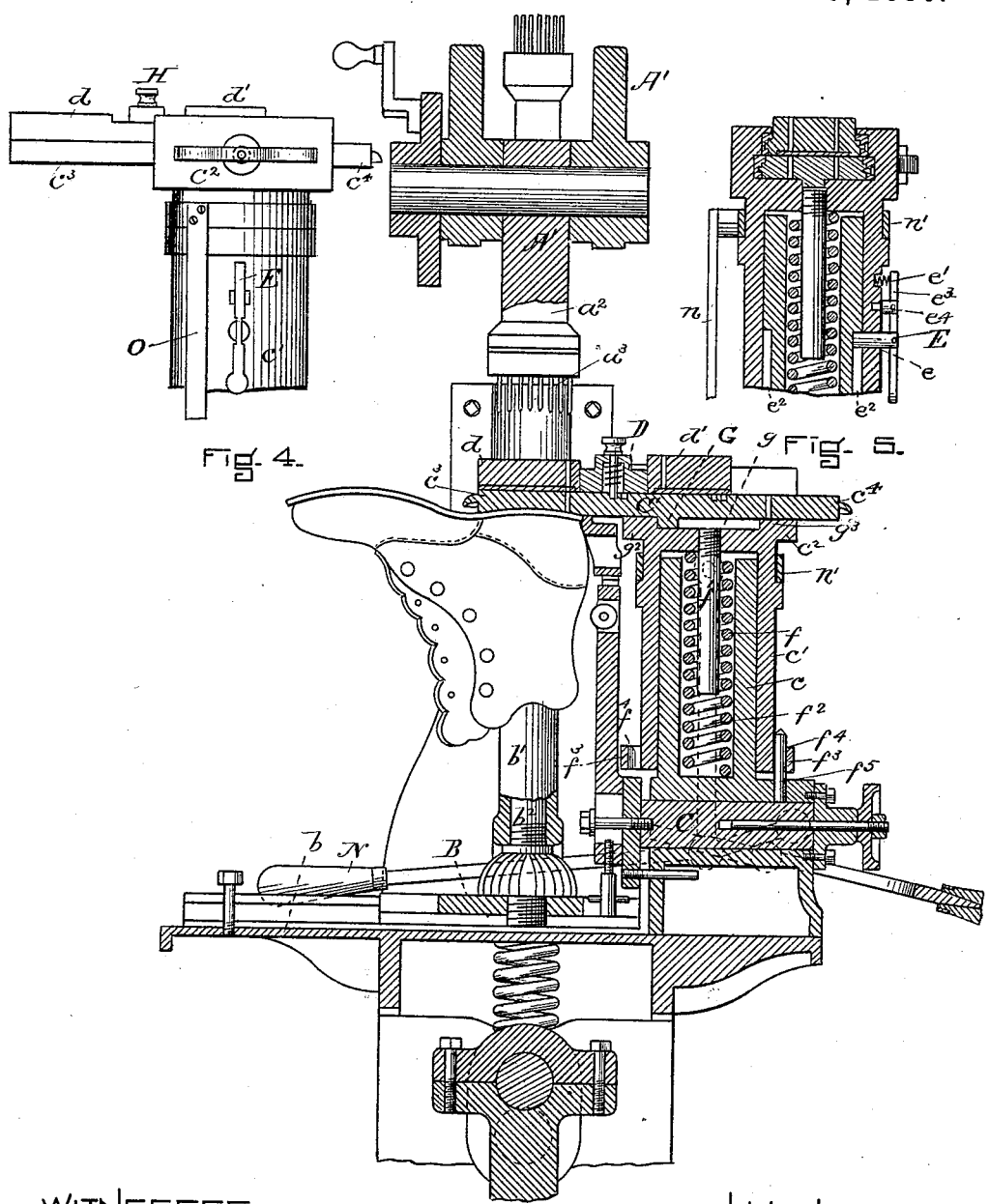

No. 344,499. Patented June 29, 1886.

WITNESSES.
Fred. B. Dolan
J. M. Dolan

INVENTOR.
F. F. Raymond 2d (No Model.) 5 Sheets—Sheet 5.

F. F. RAYMOND, 2d.
HEEL NAILING MACHINE.

No. 344,499. Patented June 29, 1886.

WITNESSES.
Fred. B. Dolan
J. H. Dolan

INVENTOR.
F. F. Raymond

United States Patent Office.

FREEBORN F. RAYMOND, 2D, OF NEWTON, MASSACHUSETTS.

HEEL-NAILING MACHINE.

SPECIFICATION forming part of Letters Patent No. 344,499, dated June 29, 1886.

Aplication filed December 3, 1885. Serial No. 184,584. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification in explaining its nature.

It is very desirable in the manufacture of boots and shoes to secure the heel end of an outsole to the upper or upper and insole by metal fastenings, preferably headed fastenings having clinchable points, before the heel is attached, and it is the practice with some manufacturers to-day to unite the outsole to the upper or upper and insole either by stitches or pegs extending entirely around the outsole or about the shank and fore part of the sole, and to then secure the heel-section of the sole to the upper or upper and insole by separate or single fastenings driven successively by hand or by a machine, generally the former, and then to secure the heel thereto by hand-nailing or by machine. The nailing of the heel-seat by hand permits the use of headed fastenings, but is somewhat expensive. The nailing by machines now ordinarily used for that purpose does not permit the use of fastenings having a well-defined head or a good clinching-point, and while it costs less than hand-nailing it does not give as good a result. While hand-nailing has provided the best work in this direction thus far known, it is still far from giving the best results obtainable, and this is largely owing to the fact that the soles are not properly shaped before the nails are driven, that they are not held shaped while they are being driven, and because the nails are not driven uniformly with proper regard to their position in relation to the edge of the outsole and also to each other. It is therefore obvious that the boot or shoe thus treated is not in the best shape or condition to receive the heel, and that the efficiency of the heeling may be seriously impaired by the previous imperfect construction of the shoe.

My invention aims to secure in the nailing of the heel end of the sole and the attachment of the heel the desirable features of hand-nailing, and at the same time to obtain a superior result and at less cost. This is accomplished by forming the outsole to the required shape before the fastenings are driven, and in driving the fastenings into the outsole and upper or upper and insole as a gang or group, and while the outsole is held formed and in a uniform manner sufficiently near the edge of the sole to pass through the lasted-in edge of the counter or heel stiffener and so that the outsole, counter, or stiffener, upper and insole shall be rigidly and firmly fastened together by inflexible fastenings as near the outer edge of the outsole as practicable, and to secure a strong, unyielding, and shapely heel-seat firmly fastening, clamping, and holding the counter or stiffener and upper in place, fastening the counter or stiffener to the out and in soles near its inner vertical edge, and properly preparing the heel end of the boot or shoe for the reception of the heel by providing a base or support which, although made up of a number of parts, is practically solid and furnishes a thick body for the reception and holding of the heel-fastenings.

My invention comprises mechanism adapted to form the outsole, upper, and insole to the desired shape or curvature, and to secure them together while thus formed or while held between two holding or holding and shaping surfaces by a gang or group of fastenings, and in the use in connection with the mechanism for thus forming and securing the outsole of devices for compressing the heel-blank upon this formed and fastened heel-section of the outsole, and for attaching it thereto and to the insole by a gang or group of attaching-nails simultaneously driven; and also in means for attaching the top lift thereto, if the heel is blind-nailed, and for breasting the heel, if desired, the boot or shoe preferably being held upon its last or support during the successive operations of forming and fastening the heel end of the sole, and of compressing the heel-blank thereon and attaching it thereto and securing the top lift in place and breasting the heel; and I would say in this connection that the invention may include the forming of the entire sole to the surface of the last, and the fastening of the entire sole to the upper and insole prior to the compression and attachment of the heel-blank upon the heel end of the sole, if so desired.

Referring to the drawings, Figure 1 is a view part in vertical section and part in elevation of portions of a machine sufficient to illustrate the invention. Fig. 2 is a view in elevation of a revolving head. Fig. 3 is a view part in vertical section and part in elevation showing the parts represented in Fig. 1 in a different position. Figs. 4 and 5 refer to a locking device, hereinafter described. Figs. 6 and 7 further show different positions of the working parts of the machine. Figs. 8 and 9 illustrate the operation of the machine in securing the outsole to the insole. Figs. 10 and 11 show the subsequent operation of the machine in attaching the heel. Figs. 12 to 16, inclusive, show various positions of the templets and nail-carrier plates, reference to which is hereinafter made. Fig. 17 is a plan view of a removable templet-block. Fig. 18 is a view in vertical section through the templet-plate and one of the nail-holder blocks. Fig. 19 is a plan view of the templet-plate. Fig. 20 is a side elevation of the post, table, templet-plate, and nail-holder plate. Fig. 21 is a front elevation thereof. Fig. 22 is a section on the line $x\,x$ of Fig. 20. Fig. 23 is a view of a revolving head, showing a breasting-knife.

The form of the invention which I represent is that which it has upon application to the so-called "National Heel Nailing Machine."

In the drawings, A represents the cross-head of the National heel-nailing machine. It is vertically reciprocated, as described in the Henderson Patent No. 316,894, or in any other desirable way. It has a revolving head, A', having an arm, $a$, carrying or supporting a gang or group of awls, $a'$, arranged in their holding-block to form holes in the outsole and near the outer edge thereof. The revolving head also has the arm $a^2$, which supports a block holding the gang or group of drivers $a^3$, which are arranged to drive the fastenings through the templet, hereinafter described, into the out and in soles of the boot or shoe. The revolving head further has the arm $a^4$ for carrying or supporting a block holding the gang or group of awls $a^5$ for piercing the heel-blank, and the arm $a^6$ holding a block for carrying or supporting the gang of drivers $a^7$ for driving the heel-attaching nails. The revolving head further has the arm $a^8$ carrying the spanker-block $a^9$, which block may have top-lift-holding devices—such as described in said Henderson Patent No. 316,894—attached, and also the arm $a^{10}$, carrying or supporting the heel-breasting knife $a^{11}$, which is attached to said arm to operate substantially as described in Patent No. 316,177. This revolving head may be turned by hand, as described in said Henderson patent, or be automatically revolved, as described in my Patent No. 287,472, or in the Henderson and Raymond Patent No. 317,647.

I prefer to use a sliding jack, although I do not confine myself thereto, and in the drawings I have represented a jack consisting of the plate B, arranged to slide in suitable ways in the bed-plate $b$ of the machine, and which has a sleeve, $b'$, supporting a post, $b^2$, vertically movable by a screw thereon, and adapted to support at its upper end a last or shoe-support, $b^3$. Behind the jack there is arranged a post, C, which is fastened to the bed of the machine, and has a cylindrical section, $c$, which receives the sleeve $c'$, extending downward from the templet table or support $c^2$. This table has a guideway extending horizontally across it, in which is arranged to slide horizontally the plate C'. This plate supports at one end the sole-nailing templet $c^3$, and at the other end the heel-nailing templet $c^4$, and there is arranged to slide upon this templet in the guideway of the table or support the plate D, at one end of which is a nail-holder and carrier, $d$, arranged to receive and hold nails for delivery to the sole-nailing templet, and at the other end the nail-holder and carrier $d'$, arranged to hold and receive nails for delivery to the heel-nailing templet. This plate is arranged to slide horizontally upon the plate C'. The table or support $c^2$ and the templets and nail-holders it carries are adapted to be revolved to bring first the sole-nailing templet into position, either directly over the last or shoe-support when in operative position or into a position from which it can be moved horizontally into such place, and after the sole-fastenings have been driven to bring the heel-nailing templet directly over the heel end of the fastened sole or to a position from which it can readily be moved thereon by a straight movement; and in order to provide the table or carriage with this movement of revolution I have fitted the sleeve $c'$ upon the post $c$ so that it may be turned thereon. Of course for the purposes of this invention it is not necessary that the carriage or table be arranged to make an entire revolution, although it is perhaps the most convenient form of construction, and I have therefore so represented it in the drawings. When, however, the table or support $c^2$ has been moved to bring either the sole-nailing or the heel-nailing templet into operative position, it is necessary to automatically lock the table or carriage to the post, and this may be accomplished in a number of ways. I have represented as one a pin, E, supported in a hole, $e$, in the sleeve $c'$, and adapted to be forced inward by a spring, $e'$, and to enter a vertical recess or groove, $e^2$, in the side of the post $c$, when the parts have been brought or moved into operative position, and this recess or groove $e^2$ is of a sufficient length to allow the subsequent vertical movement of the table or carriage. To disengage the pin from this recess or groove, I move a lever, $e^3$, which is pivoted at $e^4$. It will be necessary either that the post have two grooves oppositely arranged, within which the pin shall successively enter as the carriage or table is revolved, or that there be used two spring-operated pins to engage in succession each of the grooves. For convenience of operation the last-named construction is preferable. The table or carriage is also provided with a vertical movement upon the post $c$, in opposition to the spring $f$. This spring preferably surrounds the rod $f'$, which is fastened to the table $c^2$, and extends downward into the hole $f^2$ in the post, and it operates as a support for the coiled spring $f$. The table or support $c^2$ may be moved vertically either by contact of the flat face of the awl or driver-supporting block, or both, with the upper surfaces of the templets and nail-holders, or by means of a connecting-rod positively operated from one of the shafts of the machine, as described in my application filed November 18, 1885, No. 183,178, or in any other desired way; and for the purpose of further locking and staying it during its downward movement I have represented the sleeve $c'$ as having extensions $f^3$, provided with the hole $f^4$, which holes are adapted to receive the steady-pin $f^5$ upon the downward movement of the table.

I would here remark that so far as my invention relates to the successive bringing into operation of the sole-nailing templet and the heel-nailing templet and their loading devices it is immaterial whether the table $c^2$ be provided with a vertical movement or not, for instead of providing it with a vertical movement to form the sole and compress the heel-blank, the jack or last may be moved upward against the templet-plate by means substantially as described in my Letters Patent No. 322,560.

To limit the extent of movement of the plate $C'$ in its support or carriage I have arranged a stop, G, which enters a recess, $g$, in the upper surface of the table, and it is adapted to engage successively with the two stops $g^2 g^3$.

For locking the templets in operative position I use a spring-pin, $G'$, playing through a hole in the side of the table, and adapted to enter in succession the holes $g^4$ in the side of the templet-plate, the pin serving to lock the templet in an operative position. It also serves, as will hereinafter be seen, to hold the templet-plate locked back, so that neither of the templets shall be in operative position. The templet-plate is represented as being moved in its guideways by the push-knob $g^5$, which extends forward from the templets.

I have also arranged for locking the plate D in operative position, either when the sole-nail holder or the heel-nail holder is in position to deliver its nails, the spring-pin H, which passes through the hole $h$ in the nail-holder plate D, and is arranged to enter the holes $h'$, $h^2$, $h^3$, and $h^4$ in the plate $C'$. It engages the holes $h'$ when the plate D is moved to bring the holes of the sole-nail carrier in register with holes of the sole-nailing templet. It enters the hole $h^4$ when the plate D has been moved to bring the holes of the heel-nail carrier in line with the holes of the heel-nailing templet; and when not in one of these positions the pin engages either the hole $h^2$ or $h^3$, so that the nail-holder shall be held out of line with their respective templets while these holes are being filled with nails or fastenings.

I may use for covering the holes in these nail-carriers either the revolving plate—such as is described in the Henderson Patent No. 316,894—or a sliding plate—such as is described in the Soule application, filed December 22, 1884, No. 150,908—or magnets, as described in Patent No. 315,458, or any other suitable device for holding the nails therein while the holders are being moved.

If desired, the sole-nailing templet and the heel-nailing templet, or either of them, may be made removable from their supporting-plate, as may also the sole-nail holder and the heel-nail holder; and I have shown in the drawings the templets and nail-holders as made removable, and as the construction employed is the same in all cases, I will describe the construction of the sole-nailing templet-holder. The plate $C'$ has a recess, M, at one end which is wider at the bottom than at the top, and this hole is formed to receive a sole-nailing templet-block, which is shaped substantially as represented in plan Fig. 17. The plate $C'$ has a V-shaped hole, $m$, at the end of the recess M, which receives a pointed projection, $m'$, extending from the templet-plate. The templet-block also has the lateral projection $m^2$, which extends into a recess, $m^3$, cut in from the side of the recess, and the plate or block is secured in place by these projections $m'$ $m^2$ and by a screw-pin, $m^4$, which enters a screw-hole in the side of the plate, and a recess or cup formed in the edge of the plate or block, as represented in Fig. 18. The templet-block is fitted to the shape of the recess, and consequently a shoulder, $m^5$, is provided to hold the block firmly when subjected to the upward pressure of the heel-blank either after compression and before the attaching-nails are driven or when the heel-blank is lifted against it by a vertically-movable heel-support. When the entire sole is nailed, the sole-nailing templet will be of course longer than when only the heel end of the sole is nailed, and it will have a cavity of a proper shape to form the sole to the bottom of the last.

In operation the boot or shoe is mounted upon the jack or work-support and moved into position below the sole-nailing templet, which may have been previously placed or which may be moved into position after the boot or shoe has been so located. The sole-nailing templet is then brought down upon the sole by means of the lever N and link $n$ connecting it with the loose collar $n'$ on the table or support.

If awls are used for piercing the sole preparatory to feeding the nails, the awl-block bearing such awls is brought into proper position and the machine reciprocated. This reciprocation forms awl-holes in the sole or soles, and compresses the sole between the under surface of the sole-nailing templet and the heel support or last. The table and templet are locked in this position by means of the latch O and catch o on the side of the machine, so that the sole is held formed to the surface of the heel support or last. The sole-templet nail holder and carrier which has previously been loaded with nails of the proper form—and I prefer headed nails with clinchable points—is then moved into position to deposit its nails into the holes of the sole-nailing templet. The drivers for driving the sole-fastenings are then moved into position, and upon a second reciprocation of the cross-head the fastenings are driven into the sole and upper or sole simultaneously, firmly securing the outsole to the upper, or to the upper and insole, while it is held formed and compressed, as above described. The latch O above named is then thrown off by a forked lever, $o'$, and the table allowed to rise to its original position, and, without withdrawing or removing the sole-nailing templet and nail-holder back to their original position, the table is revolved by hand to bring the heel-nailing templet into operative position. The heel-nailing templet is then moved forward to bring it over the heel end of the boot or shoe, and the heel-blank is placed in position upon the sole thereof. This movement of the templet-plate $C'$ leaves the sole-templet nail-holder $d$ in a position to be filled with nails, the heel-templet nail-holder which previously occupied the same position having been filled. The heel-nailing templet is then brought down upon the surface of the heel by the lever N, and the arm of the revolving head carrying the awls for piercing the holes in the heel-blank having been brought into operative position, the cross-head is reciprocated and the heel pierced, and at the same time the heel is compressed and the templet locked down thereon by the latch, which then engages the catch $o^2$. The plate D is then moved to bring the holes of the heel-nail holder in register with the holes of the heel-templet, and the nails are deposited in the holes of the heel-templet. The revolving head is again moved to bring the heel-nail drivers into position, and the cross-head is reciprocated and the heel-attaching nails driven into and through the heel-blank and sole or soles of the boot or shoe; and if the heel is to be blind-nailed the ends of the nails preferably are left projecting from the upper surface of the attached heel. The latch O is then again released and the table automatically assumes its normal position. It is then revolved to bring the sole-nailing templet into position. Meanwhile the spanker-arm of the revolving head has been brought into operative position, and if the top-lift-holding device is secured thereto a top lift has been placed thereon; or, if the top lift is fed by an independent plate (not shown) independently, as described in various of my applications, it is moved into position. Another reciprocation of the cross-head spanks the top lift onto the heads or ends of the heel-attaching nails. The spanker-arm is then moved out of position and the heel-breasting device moved into operative position, and the cross-head again reciprocated to breast the attached heel. The boot or shoe is then finished and removed from the last or work-support.

If, instead of moving the templets vertically, the last or heel support be moved vertically to the templets, the operation of the machine remains substantially the same, the only difference being that the last or work-support is moved upward at intervals instead of the templets downward.

I do not confine myself to the especial form of construction herein shown and described, whereby the sole and heel nailing templets are alternated, but may use in lieu thereof any suitable construction—the mechanical equivalent for that above described—for bringing or moving the plates successively into operative position with the last or work-support, and the awls, drivers, &c; and I would say in this respect that I consider that separate templet-plates, one of which has the sole-nailing templet and the other the heel-nailing templet arranged so that one is first moved into operative position and withdrawn, and then the other moved into operative position and withdrawn, either upon diagonal lines or one from one side of the jack when in operative position and the other from the opposite side thereof, are equivalents for this portion of my invention.

It will be seen that by the use of the successive sole-nailing and heel-nailing devices in one machine, adapted to operate as herein specified, a saving in time of nailing the two parts is made, that the work is more uniform and better done, and that the cost of doing the work is materially lessened as compared with the process now in vogue.

The operation of the device when the entire sole is nailed is substantially as above described.

I would state that the sole-nailing device may comprise the gang of awls and gang of drivers or the gang of drivers only, and that the heel-nailing devices may comprise a gang of awls, a gang of drivers only, or the gang of awls and gang of drivers and top-lift-applying devices, or the heel-nailing devices may include additionally as an element the heel-breasting device.

The position which the sole-nailing templet and nail-loader bear to each other and to the work immediately before the machine is set in operation is well shown in Figs. 1 and 2. Figs. 3 and 13 show the position of these parts after the fastenings have been fed to the sole-templet.

Figs. 6 and 15 show the heel-nailing templet and nail-loader after they have been moved forward from the position shown in Fig. 14 to a position over the last preparatory to the action of the heel-awls.

Figs. 7 and 16 show the position of the heel-templet and its loader after the heel-awls have been reciprocated, the heel compressed, and the heel-attaching nails fed.

Figs. 8 and 9 show the shoe after its sole has been nailed, and it will be seen that the line of nails are driven close to the outer edge thereof.

Fig. 10 shows a shoe with an attached unblinded heel, and Fig. 11 an attached blinded heel, and it will be noticed that the line of the heel-fastenings come within the line of the sole-fastenings, and cannot therefore strike the sole-fastenings as they are being driven.

Figure 12:
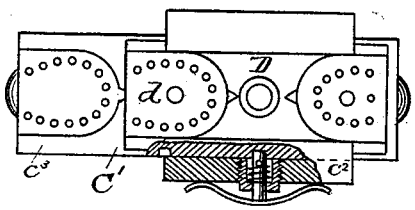
Figure 13:
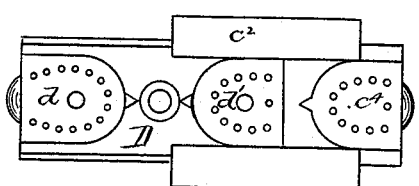
Figure 14:
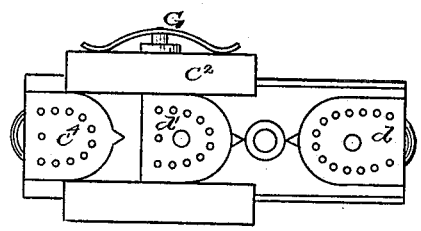
Fig. 14 shows the position of the templets and nail-loaders upon reversing the position of the templets after the sole has been nailed, and to bring the heel-nailing templet and its nail-holder into position for immediate use.
Figure 15:
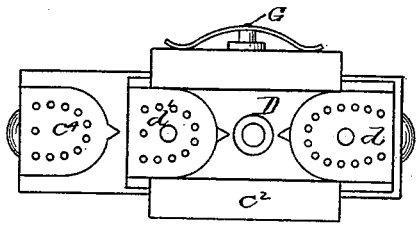
Figure 16:
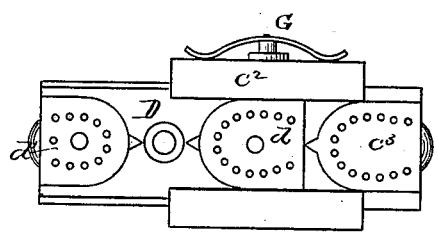
Figure 17:
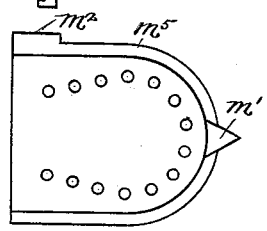
Figure 18:
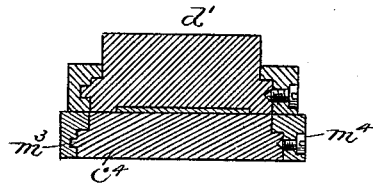
Figure 19:
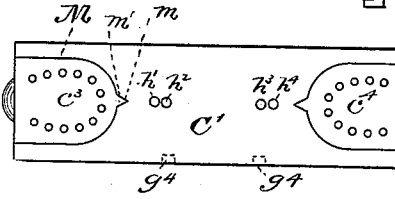
Figures 20, 22:
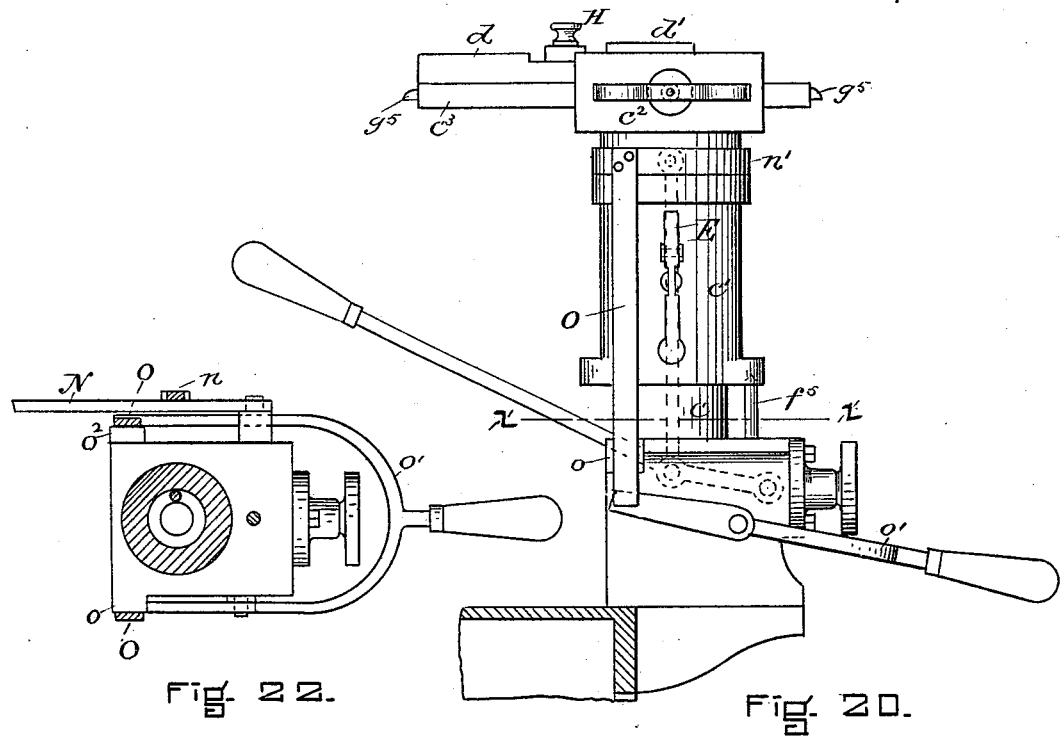
Figures 21, 23:
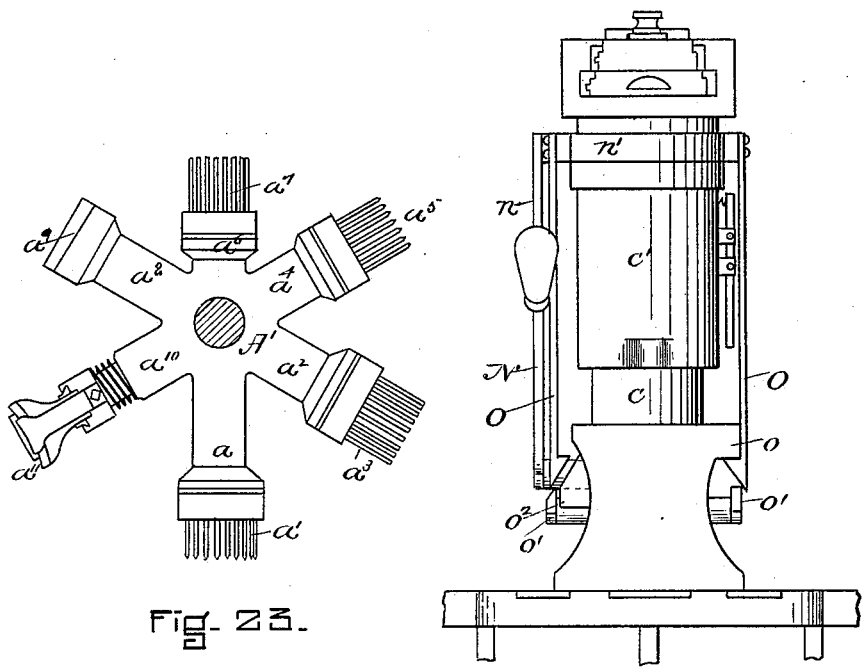

The table should be revolved to move one templet out of place and the other in without drawing the nail-holder plate back, as by so doing the sole and heel are left exposed to the action of the spanker, top-lift attacher, and breasting devices, while it brings the nail-holder plate into a position to be moved forward first to take its holes out of register with the rear templet, then to be moved forward with the templet as it is moved into position over the work, and finally to be moved forward on the templet-plate, to bring its holes in register with the holes of the templet, and so that its nails can be discharged therein.

The sole-nailing templet has a cavity or recess shaped to give proper form to the outsole.

While I have described the first of the two templets as a sole-nailing templet, I would not be understood as limiting the invention thereto, as it can be used for successively driving two gangs or groups of nails into the heel-blank, either through the top lift thereof or one through the heel-blank and the other through the top lift subsequently applied, or for any other purpose; and when the first templet is used for heel attaching or nailing it will have a flat under surface, instead of one with a cavity.

I have represented the templets $c^3 c^4$ and the nail-holders $d' d^2$ as formed in their respective plates C' E; but I would say that the templets and nail-holders may be formed or arranged in separate blocks and attached to said blocks, substantially as shown and described in earlier patents to me, and as described in the application of John W. Soule, filed December 22, 1884, Serial No. 150,908.

Having thus fully described my invention, I claim and desire to secure by Letters Patent of the United States—

1. In a heel-nailing machine, the combination of a last or work-support, a horizontally-movable sole-nailing templet, $c^3$, a horizontally-movable heel-nailing templet, $c^4$, both of said templets being adapted to be brought into the same operative position in relation to the last or work-support, and reciprocating sole and heel nailing devices, substantially as described.

2. In a heel-nailing machine, the combination of a last or work-support, a plate having a sole-nailing templet, and a heel-nailing templet adapted to be moved to bring them successively into operative position with the plate having a sole-templet nail-holder and a heel-templet nail-holder and reciprocating sole-nailing and heel-nailing devices, substantially as and for the purposes described.

3. The combination, in a heel-nailing machine, of the post C, the table or support $c^2$, arranged to be revolved upon the post, and carrying a plate having a sole-nailing templet and a heel-nailing templet with said templets, all substantially as for the purposes described.

4. The combination, in a heel-nailing machine, of the last or work-support, the post C, the table $c^2$, adapted to be revolved thereon, the sliding templet-plate C', having at one end a sole-nailing templet and at the other end a heel-nailing templet, with the sole-nailing and heel-nailing devices, substantially as described.

5. The combination of the last or heel-support, the post or support C, the table or support $c^2$, adapted to be revolved upon the post, the sliding templet-plate C', having at one end a sole-nailing templet and at the other a heel-nailing templet, and the plate D, supported by the said plate C', having at one end a sole-templet nail-loader and at the other end a heel-templet nail-loader, with the sole-nailing and heel-nailing devices, substantially as described.

6. The combination of the last or heel-support, the post or support C, the table $c^2$, supporting the sole-nailing and heel-nailing templets, and sole-templet nail-loading block and heel-templet nail-loading block, and devices, substantially as specified, for automatically locking the table to the post when the templets are brought successively into operative position, to prevent the further turning of the table on the post, substantially as described.

7. The combination, in a heel-nailing machine, of the post or support C, the table $c^2$, adapted to be revolved thereon and supporting the sole-nailing and heel-nailing templets and their loading devices, with latching or locking mechanism, substantially as described, adapted to lock automatically the sole-templet down on the sole and the heel-templet upon the heel, all substantially as described.

8. The combination of the plate C', having the holes $h'$, $h^2$, $h^3$, and $h^4$, with a spring pin or latch, H, substantially as described.

9. The combination of the plate C', having the holes $g^4$ and spring-pin G, substantially as described.

10. The combination of the table having the holes $f^4$ with the registering-pin $f^5$, substantially as described.

11. The combination of the post $c$, having the recess or recesses $e^2$, with the locking pin or pins $e$, essentially as described.

12. The combination of the rotary table, the single latch O, and the catches $o\ o^2$, substantially as described.

13. The combination of the table, the lever N, link $n$, and collar $n'$, substantially as described.

14. In a heel-nailing-machine, the combination of the rotary plate C', provided with a templet at each end, with the rotary plate D, provided with a nail-loader at each end, all substantially as described.

15. The removable templet or nail-holder block having the projection $m^2$ and shoulder $m^5$, substantially as described.

16. The removable templet or nail-holder block having the projection $m'$, substantially as described.

17. The combination of the plate C', having the recesses M, $m$, and $m^3$, with the removable templet-block having the shoulder $m^5$, projections $m^2\ m'$, and a locking device for locking the block to the templet.

FREEBORN F. RAYMOND, 2D.

Witnesses:
 J. M. DOLAN,
 FRED. B. DOLAN.